United States Patent [19]

Saito

[11] Patent Number: 4,661,872

[45] Date of Patent: Apr. 28, 1987

[54] HEAD UNIT FOR PREVENTING HEAD OSCILLATION DUE TO DISEQUILIBRIUM BETWEEN HEAD AND RECORDING MEDIUM

[75] Inventor: Makoto Saito, Chichibu, Japan

[73] Assignee: Canon Denshi Kabushiki Kaisha, Chichibu, Japan

[21] Appl. No.: 641,837

[22] Filed: Aug. 17, 1984

[30] Foreign Application Priority Data

Aug. 24, 1983 [JP] Japan ................................ 58-153168

[51] Int. Cl.⁴ .......................... G11B 5/48; G11B 21/16
[52] U.S. Cl. ................................................. 360/104
[58] Field of Search ............................... 360/103, 104

[56] References Cited

U.S. PATENT DOCUMENTS

| | | | |
|---|---|---|---|
| 4,151,573 | 4/1979 | Tandon et al. | 360/104 |
| 4,343,025 | 8/1982 | Kronfeld et al. | 360/104 |
| 4,449,155 | 5/1984 | Meier et al. | 360/103 |
| 4,473,855 | 9/1984 | Plotto et al. | 360/103 |
| 4,549,239 | 10/1985 | Kawajiri | 360/104 |

*Primary Examiner*—Robert S. Tupper
*Assistant Examiner*—Melissa J. Koval
*Attorney, Agent, or Firm*—Spencer & Frank

[57] ABSTRACT

A head unit having a recording and/or reproducing head mounted on a resilient plate and having a contact surface which is brought into contact with a disc-like recording medium by depressing at a point which is located on the contact surface side remote from the center of displacement of the resilient plate. This arrangement prevents oscillation of the head caused by disequilibrium between the pressure of the contact surface of the head and sliding resistance of the recording medium during recording or reproducing, so that stable recording and/or reproducing is performed.

8 Claims, 5 Drawing Figures

HEAD UNIT FOR PREVENTING HEAD OSCILLATION DUE TO DISEQUILIBRIUM BETWEEN HEAD AND RECORDING MEDIUM

BACKGROUND OF THE INVENTION

1. Field of the Invention

The present invention relates to a head unit, and more particularly to a head unit having a recording/reproducing head which is swingably supported by a head supporting means such as a resilient plate in such a way that the recording/reproducing head makes contact with a recording medium.

2. Description of the Prior Art

As an example of a recording/reproducing apparatus using a head unit of this type, known is a magnetic disc apparatus which records or reproduces information on or from a magnetic disc as a magnetic recording medium.

FIG. 1 shows an example of an arrangement of this type of magnetic disc apparatus.

In FIG. 1, reference numeral 1 denotes the entire magnetic head unit. The lower part of a supporting member 2 which supports the whole unit 1 has an arm 3B as an integral part thereof. A magnetic head 4B is mounted on the top of the end of the arm 3B. A resilient supporting plate 5 is fixed to the top surface of the supporting member 2. This supporting plate 5 supports the upper arm 3A in a position opposite to that of the lower arm 3B. On the bottom surface of an end of the arm 3A is mounted a magnetic head 4A.

The force of a coil spring 7 disposed between the front end of a bracket 6 whose rear end is fixed to the top of the supporting member 2 and the rear end of the arm 3A causes the upper arm 3A to be pressed toward the lower arm 3B. This pressure causes the upper magnetic head 4A to press against the lower magnetic head 4B via the disc 8 which is the magnetic recording medium, thereby holding the disc 8 between the heads 4A and 4B.

When recording or reproducing, the disc 8 is rotated by a motor (not shown) in a direction indicated by an arrow W around a central axis shown by a dash and dotted line in the drawing. The magnetic heads 4A and 4B make contact respectively with the upper and lower surfaces of the disc 8, and then recording or reproducing is performed.

In order that this recording and reproducing be performed stably and accurately, the contact surfaces of the magnetic heads 4A and 4B must follow any displacement in the surface of the disc 8, and it is necessary that the magnetic heads 4A and 4B always make contact uniformly and in parallel with the surface of the disc 8. To achieve such contact, the magnetic heads 4A and 4B are supported by a resilient plate so that the heads can be displaced within a predetermined range.

More specifically, as shown in FIG. 2, the magnetic head 4A is mounted on a resilient plate 9 which is bridged over an opening at the end of the arm 3A which project downwards. The magnetic head 4A is supported by the resilient plate 9 so that the head 4A can be displaced within a predetermined range by the resilient plate 9.

The other magnetic head 4B is also attached to and supported by a member similar to the resilient plate 9 with upside-down relation.

The resilient plate 9 is called a gimbal spring. It is formed into the shape as shown in FIG. 3 from a thin sheet having resiliency such as a resilient metal. As shown in FIG. 3, the resilient plate 9 is shaped roughly to be rectangular. From inside this rectangular shape, two pairs of elongated holes 9a and 9a, and 9b and 9b are formed in such a two-fold cutting way that each hole is substantially U-shaped and one hole of one pair is opposite to the other of the pair with a small gap therebetween, with each of the inner and outer pairs being disposed with an angular displacement of 90 degrees. That is, by this cutting, a roughly rectangular shaped frame 9c is formed on the inside of the elongated holes 9a and 9a, and a roughly rectangular shaped mounting portion 9e is formed on the inside of the elongated holes 9b and 9b. The frame 9c is linked to the peripheral portion 9g of the resilient plate 9 by two bridge portions 9d and 9d which are substantially in the center on both the right- and left-hand sides of the peripheral portion 9g, as shown in FIG. 3. The mounting portion 9e is linked to the frame 9c by two bridge portions 9f and 9f (the bridge 9f on the rear side is not seen) which are substantially in the center on the back and the front sides of the frame 9c, as shown in FIG. 3.

This arrangement allows the mounting portion 9e of the resilient plate 9 to swivel freely around an X axis passing through the bridge portions 9d and 9d and around a Y axis passing through the bride portions 9f and 9f, within a range permitted by the lengths and degree of resiliency of the bridge portions 9d and 9d, and 9f and 9f. That is, the arrangement permits free swivelling in the directions indicated by arrows C and D around a center A (as shown in FIG. 2) of swivelling which is at an intersection of the axes X and Y.

A core portion 10 in the magnetic head 4A is attached to the mounting portion 9e through a hole (not shown) formed in the mounting portion 9e and fixed in place as shown in FIG. 2. This core portion 10 consists of two thin sheet shaped cores and a spacer therebetween. Mask blocks 11 and 12 are fixed to the lower surface of the mounting portion 9e so as to support both sides of the lower half part of the core portion 10 which protrudes below the mounting portion 9e.

The mask blocks 11 and 12 are to support and protect the core portion 10. The former is substantially rectangular in shape, and the latter is formed into the shape of a block having a substantially U-shaped cross-section. The bottom surfaces of the mask blocks 11 and 12 and the bottom surface of the core portion 10 forms the contact surface 13 which makes uniform contact with the magnetic disc 8.

A magnetic gap (not shown) which performs recording and reproducing is formed in the core portion 10 on the contact surface 13.

Furthermore, a coil 14 for electro-magnetic conversion is wound arround the upper half part of the core portion 10 protruding from the top side of the mounting portion 9e. The coil 14 is connected by lead wires 16 to a flexible printed circuit board 15 having a top end which is fixed to one edge of the mounting portion 9e.

The magnetic head 4A attached to the mounting portion 9e of the resilient plate 9 which can swivel freely through a predetermined range is pressed at one point by a pivot 17 as a pressing member, as shown in FIG. 2. The rear end of the pivot 17 is fixed in position to the top part (not shown) of the arm 3A. The pivot 17 is positioned so that its tapered end presses against the pressure point B corresponding to the center of swivelling A on the mounting portion 9e.

As described above, the magnetic head 4A is swivelably mounted on the mounting portion 9e of the resilient plate 9, and arranged so that the center of swivelling A of the mounting portion 9e coincides with the pressure point B. Therefore, even an extremely small force will easily cause the head 4A to swivel in the directions shown by the arrows C and D in FIG. 3. For example, when the head 4A swivels in the direction of arrow C in FIG. 3 to incline the head 4A, the head 4A assumes an inclined position as shown in FIG. 4. A dash and dotted line indicated by the symbol V in FIG. 4 is a vertical line. Thus, the magnetic head 4A is swivelled by even a very small force, and can always follow the displacement of the disc 8 during recording and reproducing.

In the above arrangement, however, if any disequilibrium between the pressure of the contact surface 13 of the magnetic head 4A and the sliding resistance of the disc 8 should occur during recording or reproducing, so that oscillations accompanied by resonance arise in the magnetic head 4A, recording of information on to the magnetic disc 8 by the magnetic head 4A, and reproducing of information read from the magnetic disc 8 by the magnetic head 4A will be unstable.

It is supposed that these oscillations are caused by resonance which is produced when there is a slight deviation in the alignment between the center of swivelling A and the pressure point B of the mounting portion 9e on the resilient plate 9, since the magnetic head 4A is able to swivel even by a very small force.

This defects, of course, arises also with the magnetic head 4B.

Further, the above defects are not solely related to magnetic head units, but also occur in a head unit of any type of a recording/reproducing apparatus such as optical disc apparatus which perform recording and/or reproducing of information by making contact with an optical disc.

SUMMARY OF THE INVENTION

It is, therefore, an object of the present invention to provide a head unit which performs stable recording and/or reproducing operations.

It is another object of the present invention to provide a head unit having a recording/reproducing head supported by a supporting means so that the head can swivel freely, which prevents oscillations caused by a disequilibrium between the pressure of a contact surface of the head and the sliding resistance of the disc during recording or reproducing.

In order to achieve these objects, in a first aspect of the present invention, a head unit has a head means having a first surface for recording or reproducing information on or from a recording medium while in contact with the recording medium, and a second surface which is opposite to the first surface; a supporting member for supporting the head means at the second surface thereof in a manner that the supporting member permits a displacement of the head means in directions excluding the displacement around an axis which is perpendicular to the first surface and the second surface of the head means; and a depressing member for depressing the head means at a depressing position which is substantially along the axis and is closer to the first surface than to a center of displacement of the head means permitted by the supporting member.

Here, the supporting member may include a gimbal spring and the depressing member may include a pivot.

The combinations, each having the head means, the supporting member and the depressing member may be respectively arranged in opposing relation to each other in a manner that the recording medium is to be inserted between the combinations.

It is preferable that the second surface of the head means has a recess having a bottom surface, so that the depressing member depresses the bottom surface.

The recording medium can be a magnetic recording medium and the head means includes a magnetic head for recording and/or reproducing information on and/or from the magnetic recording medium.

In a second aspect of the present invention, a magnetic head unit has a magnetic recording and/or reproducing head having a first surface for recording and/or reproducing information and/or from a magnetic recording medium while in contact with the magnetic recording medium, and a second surface which is opposite to the first surface and which has a recess having a bottom surface; a gimbal spring for supporting the magnetic head at the second surface thereof in a manner that the gimbal spring permits a displacement of the magnetic head in directions excluding the displacement around an axis which is perpendicular to the first surface and the second surface of the magnetic head; and a pivot for pressing the bottom surface of the recess at a position which is substantially along the axis.

Here, the combinations, each having the magnetic head, the gimbal spring and the pivot are respectively arranged in opposing relation to each other in a manner that the recording medium is to be inserted between the combinations.

The above and other objects, effects, features and advantages of the present invention will become more apparent from the following description of the preferred embodiments thereof taken in conjunction with the accompanying drawings, in which;

DETAILED DESCRIPTION OF THE PREFERRED EMBODIMENTS

Figure 1:
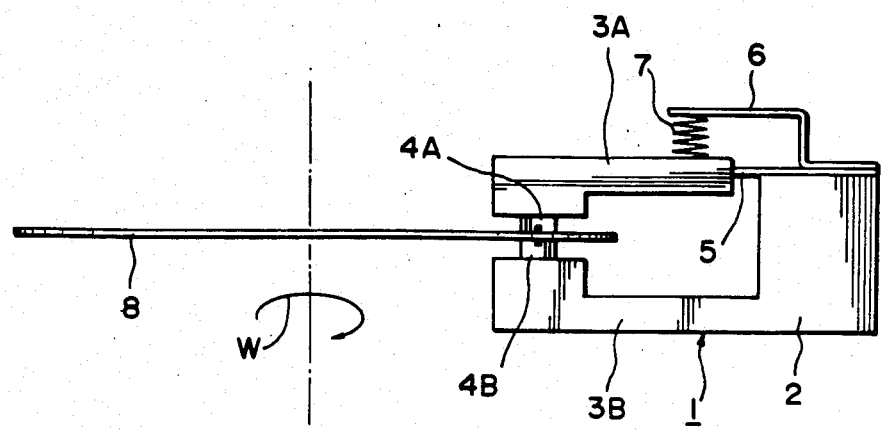
FIG. 1 is a side view showing an outline of a general arrangement of a magnetic head unit used in a magnetic disc apparatus.
Figure 4:
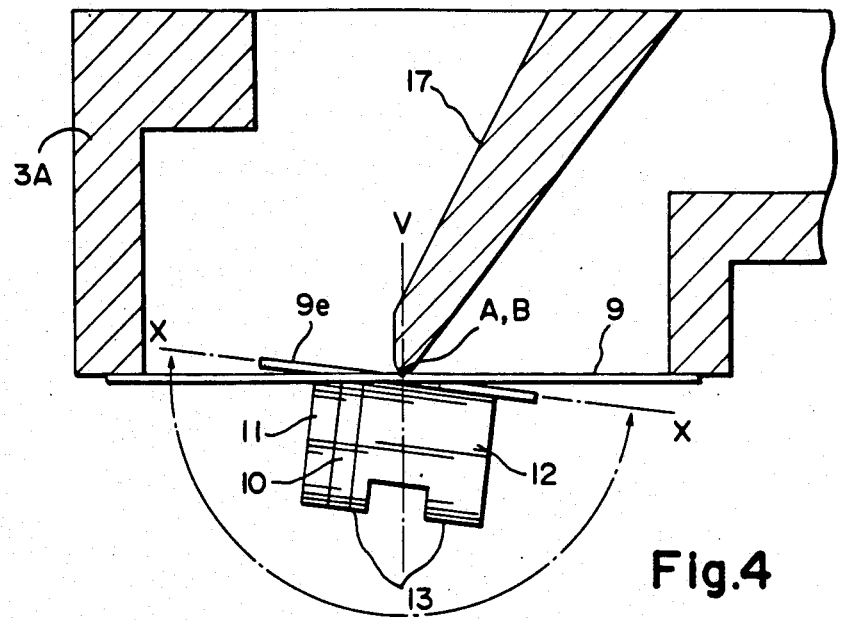
FIG. 4 is a cross-sectional view showing the magnetic head in a swivelled position in the conventional magnetic head unit.
Figure 5:
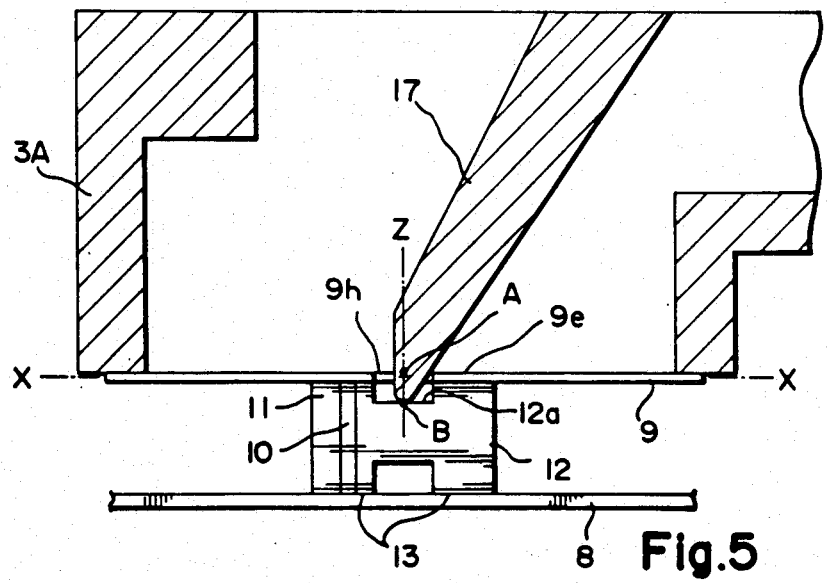
FIG. 5 is a side view showing an arrangement of the essential parts in a magnetic head unit of a magnetic disc unit of an embodiment of the present invention.

FIG. 5 shows an embodiment of a magnetic head unit according to the present invention. Here, the magnetic head unit is applied to the magnetic disc apparatus shown in FIG. 1. The same reference numerals are used in FIG. 5 as in FIGS. 1–4 for corresponding or equivalent parts, and no further explanation will be given for those parts. For the sake of easy understanding of the present invention, the portion of the magnetic head 4A protruding above the resilient plate 9 and the flexible printed circuit board 15 have been omitted.

Figure 2:
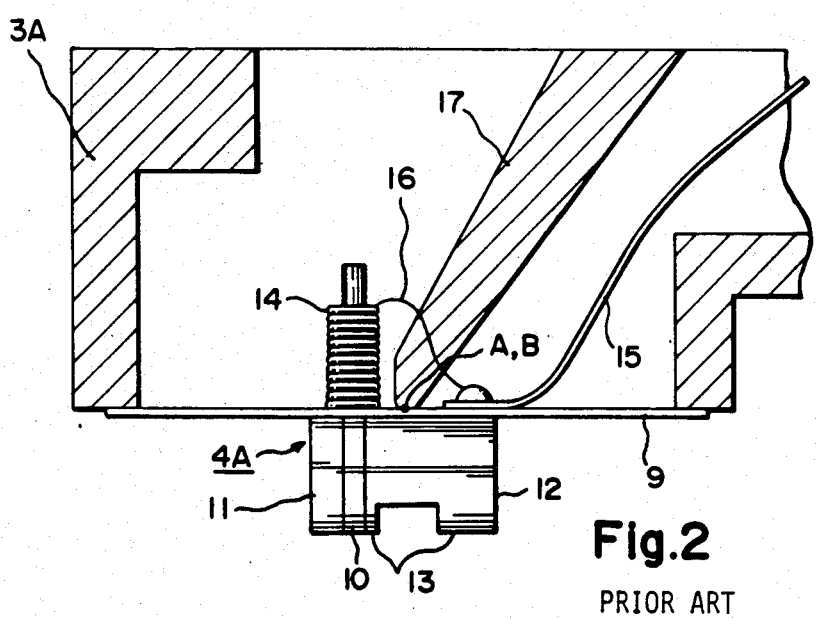
FIG. 2 is a cross-sectional view showing an arrangement relating to a magnetic head in a conventional magnetic head unit.
Figure 3:
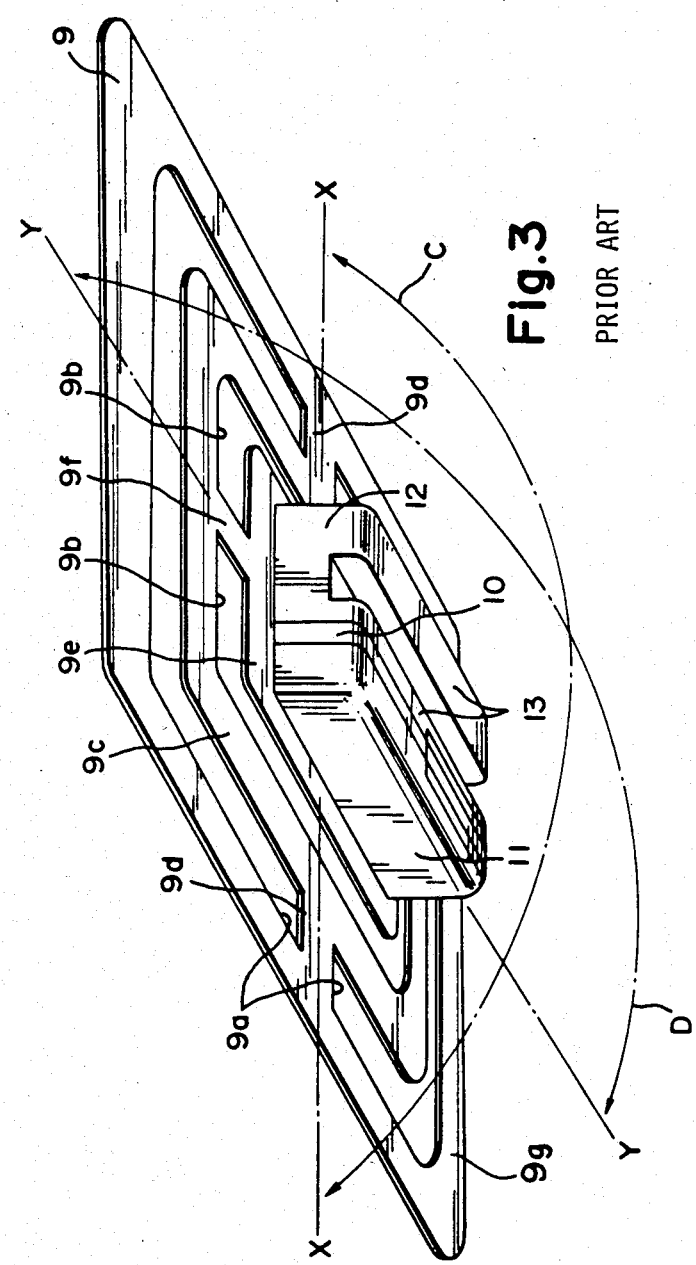
FIG. 3 is a perspective view viewed from below of the arrangement relating to the magnetic head shown in FIG. 2.

As shown in FIG. 5, the arrangement of a magnetic head 4A according to the present embodiment is, with the exception of one part, almost the same as the conventional magnetic head illustrated in FIGS. 2-4 and is attached in the same manner to the resilient plate 9 as a head supporting member. In the embodiment, a recess 12a is formed in the top plane of the mask block 12. Furthermore, the resilient plate 9 has almost the same shape as in the conventional type, except that a hole 9h is formed in a portion of the mounting portion 9e which is opposite to the recess 12a. The end of the pivot 17 as a head pressing member passes through the hole 9h and sits in the recess 12a, so that the end of the pivot 17 presses against the pressure point B on the bottom plane of the recess 12a. Further, pressure point B is positioned so that it lies on a vertical line Z with respect to the horizontal plane of the mounting portion 9e which includes the center of swivelling A on the mounting portion 9e.

With the above arrangement, pressure point B is located closer to the contact surface 13 of the magnetic head 4A than to the center of swivelling A, so that the arrangement has an effect of lowering the center of gravity with respect to the contact surface 13 as the base which has a constant area. Therefore, the contact surface 13 is extremely stably depressed by this arrangement, so that the magnetic head 4A makes stable contact with the disc 8 during recording or reproducing. As a result, the balance between the depressing force of the contact surface 13 and the sliding resistance of the disc 8 is stabilized, and therefore the magnetic head 4A is prevented from oscillating during the contact due to disequilibrium between the pressure of the contact surface 13 and the sliding resistance of the disc 8. According to experiments conducted by the inventor, extremely effective suppression was achieved particularly of oscillations having relatively high frequencies in the range from several thousands to several tens of thousands of Hz and of oscillations accompanied by resonance.

Although it may be foreseen that the location of pressure point B which is remote from the center of swivelling A makes it more difficult for the magnetic head to swivel than in the conventional arrangement, results of experiments by the inventor indicate that there is absolutely no problem with respect to a traceability by the magnetic head for a disc rotating at a rotating speed of around 300 rpm.

In the above, while an explanation has been made of a upper magnetic head 4A, the similar arrangement can be employed for the lower magnetic head 4B.

Furthermore, the present invention is not limited to the magnetic head unit of the embodiments as described above, but also can be applied easily to other types of head units used for other recording medium. For example, the present invention can be advantageously applied to an optical disc unit.

As is clear from the above explanation, in the embodiment of a head unit according to the present invention, the recording and/or reproducing head mounted on the swivelling surface of a head supporting member such as a resilient plate is depressed at a single point, which is remote from the center of swivelling on the swivelling surface of the head supporting member toward the depressing direction, so that the contact surface of the head is brought into contact with the recording medium. Accordingly, the arrangement prevents in an inexpensive and simple way, oscillation of the head which would be caused by disequilibrium between the pressure of the contact surface of the head and the sliding resistance of the disc when recording or reproducing.

Moreover, the head unit also makes it possible to perform stable recording and/or reproducing on/from a recording medium.

What is claimed is:

1. A head unit comprising:
    a head means having a first surface for recording or reproducing information on or from a recording medium while in contact with said recording medium, and a second surface which is opposite to said first surface;
    a head supporting member for supporting said head means at said second surface thereof, said supporting member permitting displacement of said head means in directions excluding displacement around an axis which is perpendicular to the first and second surfaces of said head means; and
    a depressing member for depressing said head means at a depressing position located between said first surface and said second surface, said depressing position being located substantially along said axis.

2. A head unit as claimed in claim 1, wherein said head supporting member includes a gimbal spring.

3. A head unit as claimed in claim 1, wherein said depressing member includes a pivot.

4. A head unit as claimed in claim 1, which further comprises another head means, another head supporting member and another depressing member, said another head means, another head supporting member and another depressing member being arranged in opposing relation to said head means, supporting member and depressing member relative to said recording medium.

5. A head unit as claimed in claim 1, wherein said second surface of said head means has a recess having a bottom surface, whereby said depressing member depresses said bottom surface.

6. A head unit as claimed in claim 1, wherein said recording medium is a magnetic recording medium and said head means includes a magnetic head for recording and/or reproducing information on and/or from said magnetic recording medium.

7. A magnetic head unit comprising:
    a magnetic recording and/or reproducing head having a first surface for recording and/or reproducing information on and/or from a magnetic recording medium while in contact with said magnetic recording medium, and a second surface which is opposite to said first surface and which has a recess having a bottom surface;
    a gimbal spring for supporting said magnetic head at said second surface thereof, said gimbal spring permitting displacement of said magnetic head in directions excluding the displacement around an axis which is perpendicular to said first surface and said second surface of said magnetic head; and
    a pivot for pressing said bottom surface of said recess at a position which is substantially along said axis.

8. A magnetic head unit as claimed in claim 7, which further comprises another magnetic recording and/or reproducing head, another gimbal spring and another pivot, said another magnetic head, another gimbal spring and another pivot being arranged in opposing relation to said magnetic head, gimbal spring and pivot relative to said magnetic recording medium.

* * * * *